United States Patent
Chopra et al.

(10) Patent No.: US 11,797,823 B2
(45) Date of Patent: Oct. 24, 2023

(54) MODEL TRAINING WITH RETROSPECTIVE LOSS

(71) Applicant: Adobe Inc., San Jose, CA (US)

(72) Inventors: Ayush Chopra, Pitampura (IN); Balaji Krishnamurthy, Noida (IN); Mausoom Sarkar, New Delhi (IN); Surgan Jandial, Telangana (IN)

(73) Assignee: Adobe Inc., San Jose, CA (US)

( * ) Notice: Subject to any disclaimer, the term of this patent is extended or adjusted under 35 U.S.C. 154(b) by 890 days.

(21) Appl. No.: 16/793,551

(22) Filed: Feb. 18, 2020

(65) Prior Publication Data
US 2021/0256387 A1      Aug. 19, 2021

(51) Int. Cl.
| | |
|---|---|
| *G06N 3/04* | (2023.01) |
| *G06N 3/084* | (2023.01) |
| *G06F 18/214* | (2023.01) |
| *G06N 3/047* | (2023.01) |
| *G06V 10/764* | (2022.01) |
| *G06V 10/82* | (2022.01) |

(52) U.S. Cl.
CPC ............ *G06N 3/04* (2013.01); *G06F 18/214* (2023.01); *G06N 3/047* (2023.01); *G06N 3/084* (2013.01); *G06V 10/764* (2022.01); *G06V 10/82* (2022.01)

(58) Field of Classification Search
CPC ...... G06K 9/6256; G06N 3/04; G06N 3/0472; G06N 3/084; G06N 3/047; G06V 10/764; G06V 10/82; G06F 18/214
See application file for complete search history.

(56) References Cited

U.S. PATENT DOCUMENTS

2019/0171223 A1*   6/2019   Liang ..................... G06N 3/088

OTHER PUBLICATIONS

Chopra et al., "Retrospection: Leveraging the Past for Efficient Training of Deep Neural Networks", Sep. 25, 2019, ICLR 2020 Conference Blind Submission, pp. 1-11. (Year: 2019).*
Busso,"IEMOCAP: Interactive Emotional Dyadic Motion Capture Database", Dec. 2008, 31 pages.
Chen,"A Closer Look at Few-shot Classification", Apr. 8, 2019, 17 pages.

(Continued)

*Primary Examiner* — Brent Johnston Hoover
(74) *Attorney, Agent, or Firm* — FIG. 1 Patents

(57) ABSTRACT

Generating a machine learning model that is trained using retrospective loss is described. A retrospective loss system receives an untrained machine learning model and a task for training the model. The retrospective loss system initially trains the model over warm-up iterations using task-specific loss that is determined based on a difference between predictions output by the model during training on input data and a ground truth dataset for the input data. Following the warm-up training iterations, the retrospective loss system continues to train the model using retrospective loss, which is model-agnostic and constrains the model such that a subsequently output prediction is more similar to the ground truth dataset than the previously output prediction. After determining that the model's outputs are within a threshold similarity to the ground truth dataset, the model is output with its current parameters as a trained model.

20 Claims, 7 Drawing Sheets

(56) References Cited

OTHER PUBLICATIONS

Dalal,"Histograms of Oriented Gradients for Human Detection", Conference on Computer Vision and Pattern Recognition, 2005, Jun. 2005, 8 pages.
Felzenszwalb,"Object Detection with Discriminatively Trained Part Based Models", Sep. 2009, 20 pages.
Fey,"Fast Graph Representation Learning with Pytorch Geometric", Apr. 25, 2019, 9 pages.
Hadsell,"Dimensionality Reduction by Learning an Invariant Mapping", Jun. 2006, 8 pages.
Han,"DSD: Dense-Sparse-Dense Training for Deep Neural Networks", Feb. 21, 2017, 13 pages.
He,"Deep Residual Learning for Image Recognition", Proceedings of the IEEE conference on computer vision and pattern recognition, 2016., Dec. 10, 2015, 12 pages.
Hinton,"Deep Neural Networks for Acoustic Modeling in Speech Recognition", In IEEE Signal Processing Magazine, vol. 29, Issue 6, Nov. 2012, 27 pages.
Huang,"Orthogonal Weight Normalization: Solution to Optimization over Multiple Dependent Stiefel Manifolds in Deep Neural Networks", Nov. 21, 2017, 20 pages.
Jin,"Accelerated Gradient Descent Escapes Saddle Points Faster than Gradient Descent", Nov. 28, 2017, 43 pages.
Johnson,"Accelerating Stochastic Gradient Descent using Predictive Variance Reduction", Dec. 2013, 9 pages.
Kingma,"Adam: A Method for Stochastic Optimization", Dec. 22, 2014, 9 pages.
Krizhevsky,"ImageNet Classification with Deep Convolutional Neural Networks", In Advances in Neural Information Processing Systems 25, Dec. 3, 2012, 9 pages.
Krizhevsky,"Learning Multiple Layers of Features from Tiny Images", Apr. 8, 2009, 60 pages.
LeCun,"Gradient-Based Learning Applied to Document Recognition", Nov. 1998, 46 pages.
Lin,"DeepHash for Image Instance Retrieval: Getting Regularization, Depth and Fine-Tuning Right", Jun. 6, 2017, 9 pages.
Majumber,"DialogueRNN: An Attentive RNN for Emotion Detection in Conversations", May 25, 2019, 8 pages.
Mao,"Least Squares Generative Adversarial Networks", Apr. 5, 2017, 16 pages.
Mikolov,"Distributed Representations of Words and Phrases and their Compositionality", Advances in neural information processing systems., Oct. 2013, 9 pages.
Mnih,"Human-level control through deep reinforcement learning", Feb. 25, 2019, 13 pages.
Netzer,"Reading Digits in Natural Images with Unsupervised Feature Learning", Jan. 2011, 9 pages.
Nguyen,"SARAH: A Novel Method for Machine Learning Problems Using Stochastic Recursive Gradient", Jun. 3, 2017, 14 pages.
Noh,"Regularizing Deep Neural Networks by Noise: Its Interpretation and Optimization", Nov. 9, 2017, 10 pages.
Odena,"Conditional Image Synthesis with Auxiliary Classifier GANs", Jul. 20, 2017, 12 pages.
Pham,"ProxSARAH: An Efficient Algorithmic Framework for Stochastic Composite Nonconvex Optimization", Mar. 29, 2019, 45 pages.
Radford,"Unsupervised Representation Learning with Deep Convolutional Generative Adversarial Networks", ICLR 2016, Jan. 7, 2016, 16 pages.
Rowley,"Neural NetworkBased Face Detection", Jan. 1996, 6 pages.
Salimans,"Improved Techniques for Training GANs", In Advances in Neural Information Processing Systems, Jun. 10, 2016, 10 pages.
Schoff,"FaceNet: A Unified Embedding for Face Recognition and Clustering", CVPR 2015, Mar. 12, 2015, pp. 815-823.
Schuller,"AVEC 2012—The Continuous Audio/Visual Emotion Challenge", Oct. 22, 2012, 8 pages.
Schulman,"Proximal Policy Optimization Algorithms", Aug. 28, 2017, 12 pages.
Schulman,"Trust Region Policy Optimization", Apr. 20, 2017, 16 pages.
Shrivastava,"Training Region-based Object Detectors with Online Hard Example Mining", Apr. 12, 2016, 9 pages.
Simonyan,"Very deep convolutional networks for large-scale image recognition", In Journal of Computing Research Repository, Sep. 2014, 14 pages.
Snell,"Prototypical Networks for Few-shot Learning", Jun. 19, 2017, 13 pages.
Sohn,"Improved Deep Metric Learning with Multi-class N-pair Loss Objective", Dec. 2016, 9 pages.
Song,"Deep Metric Learning via Lifted Structured Feature Embedding", Nov. 19, 2015, 11 pages.
Srivastava,"Dropout: A Simple Way to Prevent Neural Networks from Overfitting", Jun. 2014, pp. 1929-1958.
Sung,"Learning and Example Selection for Object and Pattern Detection", Jan. 1996, 195 pages.
Sutskever,"On the importance of initialization and momentum in deep learning", Jun. 16, 2013, 14 pages.
Szegedy,"Rethinking the Inception Architecture for Computer Vision", Dec. 11, 2015, 10 pages.
Van, "Double Q-learning", Jan. 2010, 9 pages.
Wah,"The Caltech-UCSD Birds-200-2011 Dataset", Oct. 2011, 8 pages.
Wan,"Bootstrapping Face Detection with Hard Negative Examples", Aug. 9, 2016, 7 pages.
Wang,"Large Margin Few-Shot Learning", Sep. 21, 2018, 17 pages.
Warden,"Launching the Speech Commands Dataset", Aug. 24, 2017, 3 pages.
Xiao,"Fashion-MNIST: a Novel Image Dataset for Benchmarking Machine Learning Algorithms", Sep. 15, 2017, 6 pages.
Yuan,"Hard-Aware Deeply Cascaded Embedding", Aug. 1, 2017, 10 pages.
Zhang,"Mixup: Beyond Empirical Risk Minimization", Apr. 27, 2018, 13 pages.
Zhong,"Random Erasing Data Augmentation", Nov. 16, 2017, 10 pages.

* cited by examiner

MODEL TRAINING WITH RETROSPECTIVE LOSS

Machine learning models, such as deep neural networks, have enabled breakthroughs in various fields such as speech recognition, natural language understanding, digital image processing and generation, and so forth. In many applications, state of the art performance of these machine learning models is achieved by increasing size and complexity of data upon which an individual model is trained (e.g., by increasing a number of training samples provided to the model). Although this increased size and complexity of training data is helpful in guiding a model towards its optimal state, training remains a parameter-intensive learning process that requires significant time to generate a model with optimal parameters. As a corollary, machine learning models are often over-fitted to the dataset upon which they were trained. This over-fitting negatively impacts model performance, particularly when applied to data points that are not included within a distribution of training data points.

To address these shortcomings, various conventional approaches to training machine learning models attempt to enhance model efficiency by augmenting or normalizing training data during the training process. Collectively, each conventional approach to training a machine learning model aims to model the human ability to quickly understand and process diverse ideas. However, conventional approaches are unable to mimic the ability of a human to reference past experiences and interpretations to adapt to changing circumstances (e.g., changing data points). As a result, conventional approaches to model training attempt to leverage as large a training dataset as possible in order to account for a diverse range of data types that might be subsequently processed by the model. As a result, conventional approaches consume significant computational and network resources in training a model on a diverse dataset with the goal of mimicking a human's ability of considering past experiences, which results in over-fitted models that are limited to considering data of a same format and type as data of the training dataset.

SUMMARY

Generating a machine learning model trained using retrospective loss to continually improve model parameterization is described. A retrospective loss system receives an untrained machine learning model and an indication of a task for which the model is to be trained. The retrospective loss system initially trains the model for a plurality of warm-up iterations using task-specific loss that is determined based on a difference between training predictions output by the model and a ground truth dataset for input data upon which the model is being trained. After warming up the model via the warm-up training iterations, the retrospective loss system continues to train the model by supplementing the task-specific loss with retrospective loss, which constrains the model such that the model's subsequently output training prediction is more similar to the ground truth dataset than a previously output training prediction.

The retrospective loss is determined based on hyper-parameters specified for use in training the particular model, which may include a retrospective loss margin that is representative of a strength by which the retrospective loss constraints are enforced during training of the model. In accordance with one or more implementations, the retrospective loss margin is progressively increased during training, such that the constraints enforced by the retrospective loss become stricter as the model's parameters approach their optimal states. An additional hyper-parameter that influences the retrospective loss is a retrospective update frequency, which specifies an interval of training iterations to be completed before a subsequent update of the retrospective frequency. The retrospective update frequency thus represents functionality of the retrospective loss system to control "how far in the past" should be considered when training the model to generate predicted outputs from input data.

The retrospective loss is both model-type and data-type agnostic, such that the retrospective loss system is configured to train apply the retrospective loss techniques describe herein in training any suitable type of machine learning model for a range of different tasks or objectives, independent of a type of data included in a training dataset for the model. In response to determining that predicted training outputs of the model are within a threshold degree of similarity to the ground truth dataset for the model, the retrospective loss system outputs the model with its current parameters as a trained model. The trained model can subsequently be used to generate output data from input data, in a format as specified by the task or objective for which the model was trained.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
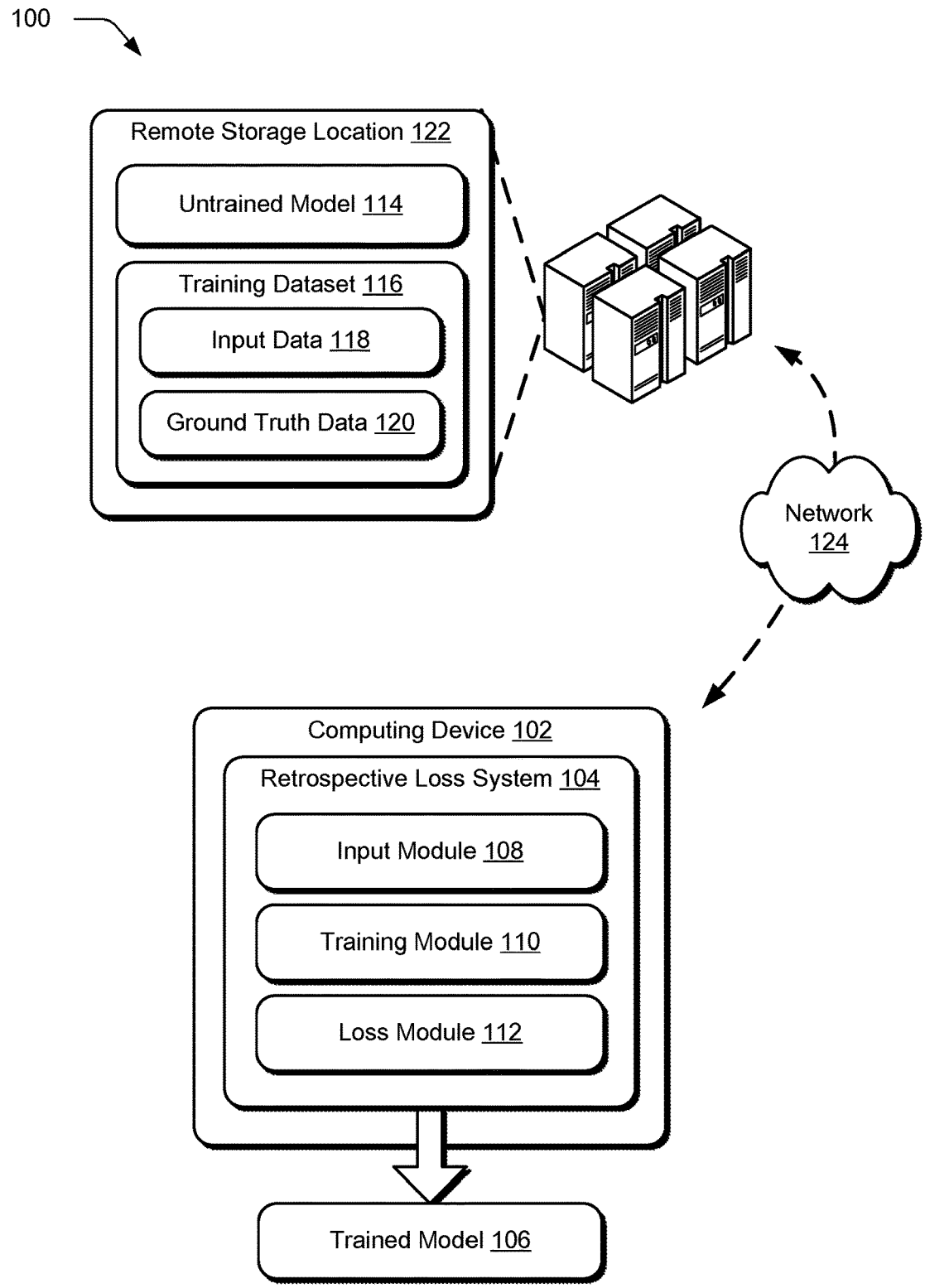
FIG. 1 is an illustration of an environment in an example implementation that is operable to employ the retrospective loss techniques described herein.

With advances in computing device technology, machine learning models such as deep neural networks are increasingly used to perform specified tasks and objectives such as speech recognition, natural language understanding, digital image processing, digital image generation, graph classification, combinations thereof, and so forth. A major challenge remains training these models to perform their specified tasks and objectives in an accurate and efficient manner. To improve accuracy of outputs generated by these machine learning models, conventional training approaches increase a number of data samples provided to the model during training, with the hope that the increased data size will enable the model to adapt to different formats and types of input data. However, these conventional approaches to training models often require manual user input to guide training of the model and, as the amount of data used to train the model increases, so too increases the amount of computational and network resources required to both collect the data and train the model with the data.

To mitigate the amount of network and computational resources required to train a machine learning model for its specified task or objective, some conventional approaches attempt to leverage information from earlier training steps to guide a model towards its optimal state. For instance, some conventional approaches to model training use gradients from earlier training steps to determine an amount by which the model's parameters are to be updated in a subsequent training step. Other conventional approaches rely on information gleaned from training other models, where different parameters used to generate a trained model are monitored during training and similarly applied while training an untrained model for a different objective. However, such conventional approaches to training machine learning models that use past training gradients and parameters from training different models merely approximate information that may be helpful in guiding subsequent training steps towards an optimal state and do not constrain the model to actually improve during training. As a consequence, conventional approaches require substantive feedback (e.g., via human user input) to train a model towards an optimal state, which results in overfitting the model to the dataset upon which the model was trained. These overfitted models are thus unable to accommodate moving targets (i.e., data not included within a distribution of the data included in the training dataset) and applicability of the overfitted model is limited to a narrow scope of input data.

Accordingly, training machine learning models using retrospective loss is described. A retrospective loss system receives an untrained machine learning model and an indication of a task or objective for which the model is to be trained (e.g., image classification, speech recognition, image generation, and the like). Based on the specified task or objective, the retrospective loss system obtains a training dataset that includes input data and ground truth data, where the ground truth data represents optimal outputs to be generated by the model when processing the input data according to its specified task or objective. The retrospective loss system then initializes the untrained model with one or more parameters and iteratively trains the model for a designated number of warm-up iterations, where the model's parameters are modified following each warm-up iteration according to a task-specific loss determined based on a difference between the model's predicted outputs and the ground truth data.

After completing the designated number of warm-up iterations, the retrospective loss system further refines the model's parameters by introducing retrospective loss. The retrospective loss represents a constraint applied by the retrospective loss system in training the model, where the constraint forces the model to subsequently output a prediction that is more similar to the ground truth data than a previously outputted prediction. Retrospective loss is determined by leveraging past predicted outputs of the model during training, and is combined together with the task-specific loss to determine a loss function that governs model parameter updates following subsequent training iterations. Training of the model continues until the retrospective loss system determines that the model's current outputs are within a threshold similarity to the ground truth data, at which point the model and its current parameters are output as a trained model. The trained model can then be provided with input data to generate an output according to the specified task or objective for which the model was trained.

By introducing the retrospective loss during training, the retrospective loss system advantageously generates a trained model that is not overfitted and is thus capable of processing input data that falls outside a distribution describing the input data used to train the model. Furthermore, the retrospective loss system represents an improvement over conventional approaches to model training in that the retrospective loss is both model and task agnostic, such that the techniques described herein are not limited to a particular machine leaning model type, objective type, or type of data upon which the model is trained. Consequently, the techniques described herein enable generation of a trained model configured to handle diverse input data without requiring the size and scope of training data otherwise necessitated by conventional approaches, thereby reducing an amount of computational and network resources used in training a model.

Example Environment

FIG. 1 is an illustration of a digital medium 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 7.

The computing device 102 is illustrated as including a retrospective loss system 104. The retrospective loss system 104 is representative of functionality of the computing device 102 to generate a trained model 106 by implementing a loss function algorithm that accounts for retrospective loss during training of the trained model 106, as described in further detail below. As described herein, the trained model 106 is representative of any type of machine learning model, including but not limited to models with architectures based on neural networks (e.g., fully-connected neural networks, convolutional neural networks, or recurrent neural networks), deep learning networks, generative adversarial networks (GANs), decision trees, support vector machines, linear regression, logistic regression, Bayesian networks, random forest learning, dimensionality reduction algorithms, boosting algorithms, combinations thereof, and so forth.

To generate the trained model 106, the retrospective loss system employs an input module 108, a training module 110, and a loss module 112. The input module 108, the training module 110, and the loss module 112 are each implemented at least partially in hardware of the computing device 102 (e.g., through use of a processing system and computer-readable storage media), as described in further detail below with respect to FIG. 7.

The input module 108 is configured to obtain an untrained model 114 to be used as the basis for generating the trained model 106. As described herein, the untrained model 114 is representative of any type of machine learning model configured to identify patterns in training data and generate output predictions based on the identified patterns. In addition to obtaining the untrained model 114, the input module 108 is configured to obtain a training dataset 116 for use in training the untrained model 114 according to a specified task or objective. The training dataset 116 includes input data 118 and ground truth data 120 that is useable by the retrospective loss system 104 to generate the trained model 106. The specific data included in the training dataset 116 is dependent on a task or objective to use in training the untrained model 114 while generating the trained model 106.

For instance, in an example implementation where the trained model 106 is configured for image classification, the input data 118 may include a plurality of unlabeled images and the ground truth data 120 may include a plurality of images that are classified based on their depicted content (e.g., via labels identifying one or more objects depicted in each image, via a tag indicating an environment depicted in the image, combinations thereof, and so forth). Alternatively, in an example implementation where the trained model 106 is configured for speech recognition, the input data 118 may include a plurality of utterances and the ground truth data 120 may include a plurality of utterances that are each associated with information describing the utterance (e.g., one or more vocabulary words included in the utterance, an identification of a speaker of the utterance, etc.). In another implementation where the trained model 106 is configured for text processing, the input data 118 may include one or more sentences of text and the ground truth data 120 may include labels identifying, for each of the one or more sentences, an emotion, sentiment, formality, and so forth, of the sentence.

Further, in an example implementation where the trained model 106 is configured for image generation, the input data 118 may include various textual descriptions of content to be represented in an image, while the ground truth data 120 may include a plurality of images that are each associated with a textual description of content describing content depicted in the image. Further still, in an implementation where the trained model 106 is configured for graph classification of data, the input data 118 may include data points collected from a plurality of different domains (e.g., social data describing a user's interactions with one or more social networking sites, browsing history for the user, purchase activity of the user, user profile information, etc.), with the ground truth data 120 including a visual representation (e.g., dot graph) representing similarities and differences among the data points. Thus, the training dataset 116 is representative of any suitable type of information useable to train a machine learning model, where the ground truth data 120 represents the ideal expected result of outputs of the trained model 106 when provided with the input data 118.

The input module 108 is configured to obtain the untrained model 114 and the training dataset 116 from any suitable source. For example, one or more of the untrained model 114 or the training dataset 116 may be received via input from a user of a computing device implementing the retrospective loss system 104, as described in further detail below with respect to FIG. 7. Alternatively or additionally, one or more of the untrained model or the training dataset 116 may be obtained by the input module 108 from a location other than the computing device implementing the retrospective loss system 104, such as from remote storage location 122, via network 124. Alternatively or additionally, the untrained model 114 and/or the training dataset 116 may be received from a plurality of different locations, such as via input to the computing device 102, from remote storage location 122, or from a different computing device via network 124. The input module 108 is further configured to communicate the untrained model 114 to the training module 110. In some implementations, the input module 108 is configured to further process the input data 118 to format the input data 118 in a manner that is useable by the training module 110 to train the untrained model 114 for a particular task or objective.

The training module 110 is representative of functionality to cause the untrained model 114 to generate outputs by specifying an objective for the untrained model 114 and providing the input data 118 to the untrained model 114. For instance, in the example implementation where the trained model 106 is configured as a speech recognition model, the training module 110 may specify as an objective for the untrained model 114 to identify one or more words represented by the utterances included in the input data 118, identify a speaker of the utterances, combinations thereof, and so forth. Alternatively, in an example implementation where the trained model 106 is configured as an image generation model, the training module 110 may specify as an objective for the untrained model 114 to illustrate information textually described in the input data 118, audibly described in the input data 118, visually described in the input data 118, combinations thereof, and so forth. Based on the objective used by the retrospective loss system 104, the training module 110 is configured to iteratively update weights of the untrained model 114 by monitoring outputs of the untrained model 114 generated in response to processing the input data 118, as described in further detail below with respect to FIG. 2.

The loss module 112 is representative of functionality of the retrospective loss system 104 to monitor the effectiveness of the training module 110 in training the untrained model 114. To do so, the loss module 112 is configured to analyze outputs of the untrained model 114 produced from the input data 118 during training by the training module 110 and compare the outputs to the ground truth data 120 of the training dataset 116. The loss module 112 is configured to compare outputs of the untrained model 114 to the ground truth data 120 using any suitable metric, which may be dependent on a specific task for which the untrained model 114 is being tailored. For instance, the loss module 112 may quantify a performance of the training module 110 in training the untrained model 114 by considering absolute differences between outputs of the untrained model 114 relative to the ground truth data 120. Alternatively or additionally, the loss module 112 may calculate a mean squared error of the untrained model 114's outputs relative to the ground truth data 120. In this manner, the loss module 112 is configured to monitor the effectiveness of the training module 110 using any suitable type of loss function, such as likelihood loss, cross entropy loss, L1 loss, squared loss, combinations thereof, and so forth. To improve a speed and efficiency at which the retrospective loss system 104 generates the trained model 106, the loss module 112 is configured to communicate determined loss to the training module 110, which is useable by the training module 110 to fine-tune weights of the untrained model 114 based on the loss function(s) specified by the loss module 112.

In addition to a task-specific loss function specified by the loss module 112, the loss module 112 is configured to determine a retrospective loss function to be used by the training module 110 in training the untrained model 114. As described herein, a retrospective loss function refers to a mathematical constraint that forces the outputs of the untrained model 114 at each step in training to be closer to the ground truth data 120 than outputs of the untrained model 114 from a previous training step. In some implementations, the loss module 112 is configured to abstain from communicating retrospective loss to the training module 110 until after a warm-up period in which the training module 110 trains the untrained model 114 using only task-specific loss. In these implementations, the retrospective loss is introduced as a training objective only after the untrained model 114 has been configured with weights that are stabilized to accommodate retrospective loss, by virtue of initial training on the input data 118. Determination and implementation of retrospective loss are described in further detail below with respect to FIG. 3.

Having considered an example digital medium environment, consider now a discussion of an example machine learning model architecture to be trained by the retrospective loss system 104 using the techniques described herein.

Figure 2:
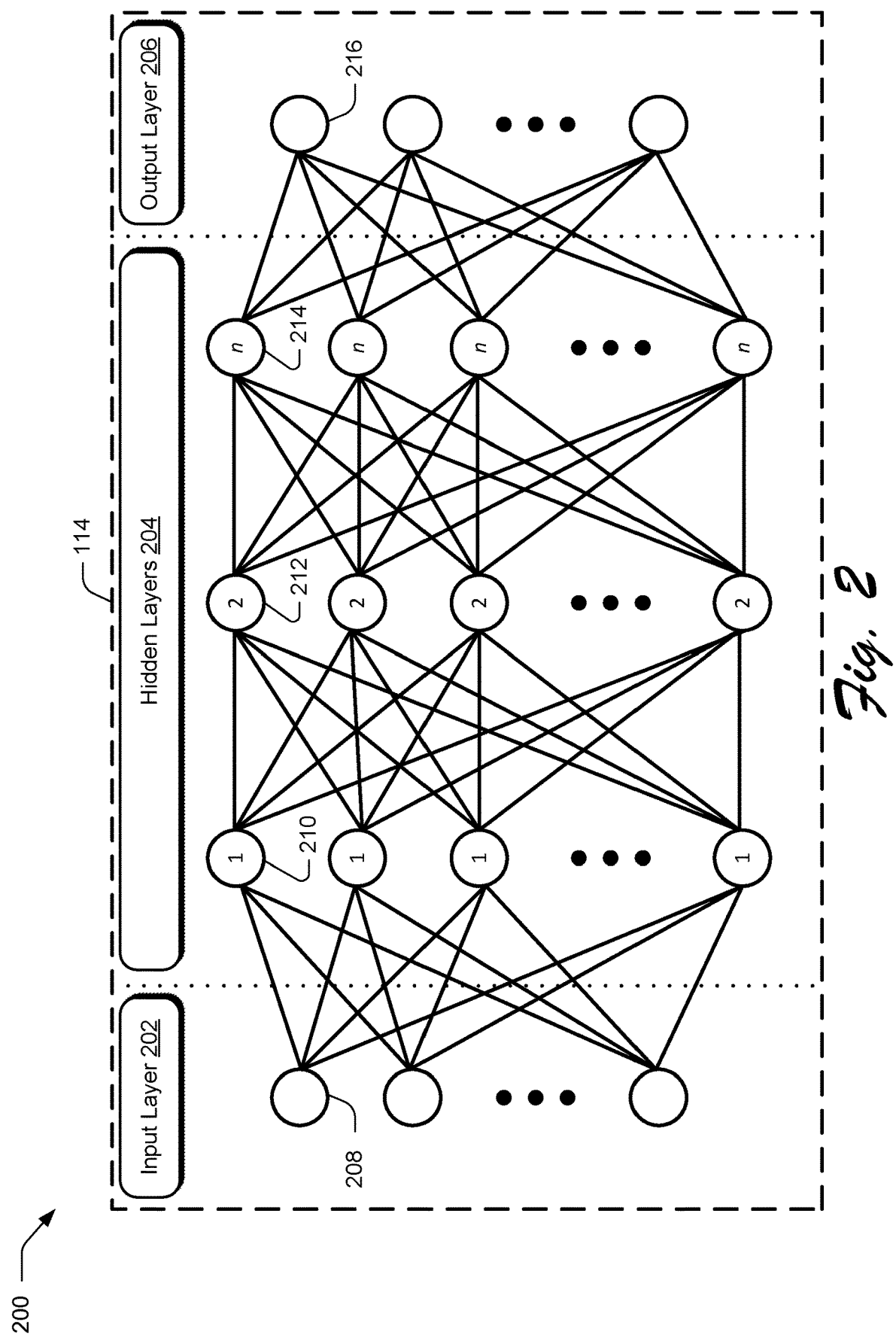
FIG. 2 illustrates an example architecture of a model to be trained by the retrospective loss system of FIG. 1 using the techniques described herein.

FIG. 2 illustrates an example architecture 200 for a machine learning model to be trained using the retrospective loss techniques described herein. In the illustrated example, the architecture 200 is representative of the untrained model 114 of FIG. 1 configured with a deep neural network architecture. Generally, the goal of a deep neural network is to correctly map inputs to outputs, where input data is abstracted by the hidden layers into higher-level features to generate a desired output. For instance, in the context of a deep neural network implemented for image classification, the deep neural network may receive an image of a car as input, in the form of a matrix of pixels. Hidden layers of this example network may first abstract pixel values and output predicted edges in the image, further arrange the predicted edges to identify objects, assign labels to the identified objects (e.g., windshield, wheel, etc.). From the identified objects, the output of the example network may be a classification of the image depicting a car. This abstraction of input data into higher-level features to generate a desired output enables deep neural networks to be tailored to a wide range of different implementations. For instance, in addition to the image classification example described above, deep neural networks may be configured for purposes of image generation, speech recognition, text processing, graph classification, combinations thereof, and so forth.

The retrospective loss techniques described herein are useable to train any type of machine learning model (e.g., deep neural network), regardless of architecture or purpose for which the model is implemented. For explanatory purposes, references herein to deep neural networks are made under the assumption of the untrained model 114 being configured using example architecture 200. In the illustrated example, the architecture 200 is representative of a deep neural network that includes an input layer 202, an output layer 206, and a plurality of hidden layers 204 disposed between the input and output layers. Each layer includes one or more neurons, which are individually represented by circles in the architecture 200. For instance, the input layer 202 is illustrated as including three input neurons, illustrated as vertically aligned with neuron 208. Although illustrated as only including three input neurons, the input layer 202 may include any suitable number of neurons, as illustrated by the ellipses separating the two neurons disposed below neuron 208. The hidden layers 204 are illustrated as including three different layers, where the first layer comprises neurons aligned vertically with neuron 210, labeled "1" in the example architecture 200 to represent a first hidden layer. The second layer of the hidden layers 204 comprises neurons aligned vertically with neuron 212, labeled "2" in the example architecture 200. The third layer of the hidden layers 204 comprises neurons vertically aligned with neuron 204, labeled "n" in the example architecture 200. As denoted by the ellipses in each of the hidden layers 204, a hidden layer 204 may include any number of neurons, and may include n different layers, where n represents any suitable integer.

The output layer is illustrated as including three output neurons, which are represented by neuron 216 and all neurons vertically aligned therewith. Each layer is fully connected by virtue of each neuron from one layer being connected to each neuron in the adjacent layer, as represented by the lines connecting each neuron to one or more other neurons.

Generally, each neuron is representative of a mathematical function configured to generate an output values from one or more input values. As an exception, neurons in the input layers and output layers of the example architecture 200 may not be representative of a mathematical function, and are rather illustrative of inputs to, and outputs from, the deep neural network. Each neuron included in a hidden layer of the example architecture 200 is parameterized by a weight θ, where the optimal parameters of the neural network at the end of training can be represented as θ*. In an implementation where the architecture 200 is representative of untrained neural network 114, the weights assigned to each neuron may be any suitable value, and may be initialized randomly by the input module 108 or the training module 110.

Given one or more input values, each neuron in the hidden layers of the architecture 200 is configured to apply a linear function to its input value (e.g., by multiplying the input value(s) by the neuron's corresponding weight to output a sum of the values), and further process the resulting output using a non-linear function (e.g., a Rectified Linear Unit (ReLU) function). In some implementations, the non-linear function may alternatively be referred to as an activation function for the network. In some implementations, a deep neural network represented by the example architecture 200 may be configured to implement a number of different activation functions to obtain a desired output.

In order to tailor a deep neural network towards a specified task (e.g., classifying an input image with one or more labels), the network is trained by the training module 110 using a loss function specified by the loss module 112. As described herein, a loss function specified by the loss module 112 is a mathematical function that indicates how well the network is performing in the context of its specified task. A generic loss function for training a deep neural network may be represented mathematically as $L_{task}$ in Equation 1.

$$L_{task}(y, \hat{y}) = \frac{1}{m}\sum_{i=1}^{m}(y_i - \hat{y}_i)^2 \qquad \text{(Eq. 1)}$$

In Equation 1, y represents the optimal value to be output by the network (e.g., a value included in a ground truth dataset used to train the neural network, such as ground truth data 120), while ŷ represents the actual output of the neural network at stage i, where training the network can proceed for m stages, with m representing any suitable integer. The goal in training the deep neural network represented by architecture 200 is to minimize the loss function for a particular task, where the loss function indicates improvement in the overall performance of the neural network as its value approaches zero.

In order to train a deep neural network, weights of various neurons illustrated in the example architecture 200 are iteratively adjusted by the training module 110 during training of the untrained model 114, with the goal of minimizing the model's loss function for its specified task. In some implementations, the retrospective loss system 104 is configured to optimize a deep neural network's loss function using a gradient descent algorithm. Mathematically, updating weights during each iteration of a gradient descent algorithm can be represented mathematically as set forth in Equation 2.

$$w_j = w_j - lr\partial \frac{L_{task}}{\partial w_j} \quad \text{(Eq. 2)}$$

In Equation 2, $w_j$ represents a weight for at least one neuron in the example architecture 200, and lr represents a learning rate, such that an updated weight is defined by subtracting its derivative and multiplying by the learning rate. The learning rate lr is representative of a hyperparameter to be tuned based on the particular task for which the untrained model 114 is being trained. To improve training efficiency, rather than computing loss derivatives at each iteration of a gradient descent algorithm, loss derivatives may be approximated by the loss module 112 using certain gradient descent algorithms (e.g., stochastic gradient descent), coupled with backpropagation. Weights of the untrained model 114 are then iteratively updated by the training module 110 to improve the untrained model 114's performance during training until the model's output(s) from the input data 118 achieves a threshold difference relative to the ground truth data 120. This threshold difference may be any suitable metric, and may be specified by a user of the retrospective loss system 104.

Using a task-specific loss function alone is helpful in training an untrained model 114, but does not itself guarantee that the output of a subsequent training step is closer to a ground truth than an output from a previous training step. To mitigate the inefficiencies and computational resources wasted by conventional approaches that use only task-specific loss in training, the retrospective loss system 104 is further configured to introduce retrospective loss during the training of the untrained model 114. Having considered an example architecture and framework for generating a trained model 106 from the untrained model 114, consider now an example implementation of retrospective loss using the techniques described herein.

Figure 3:
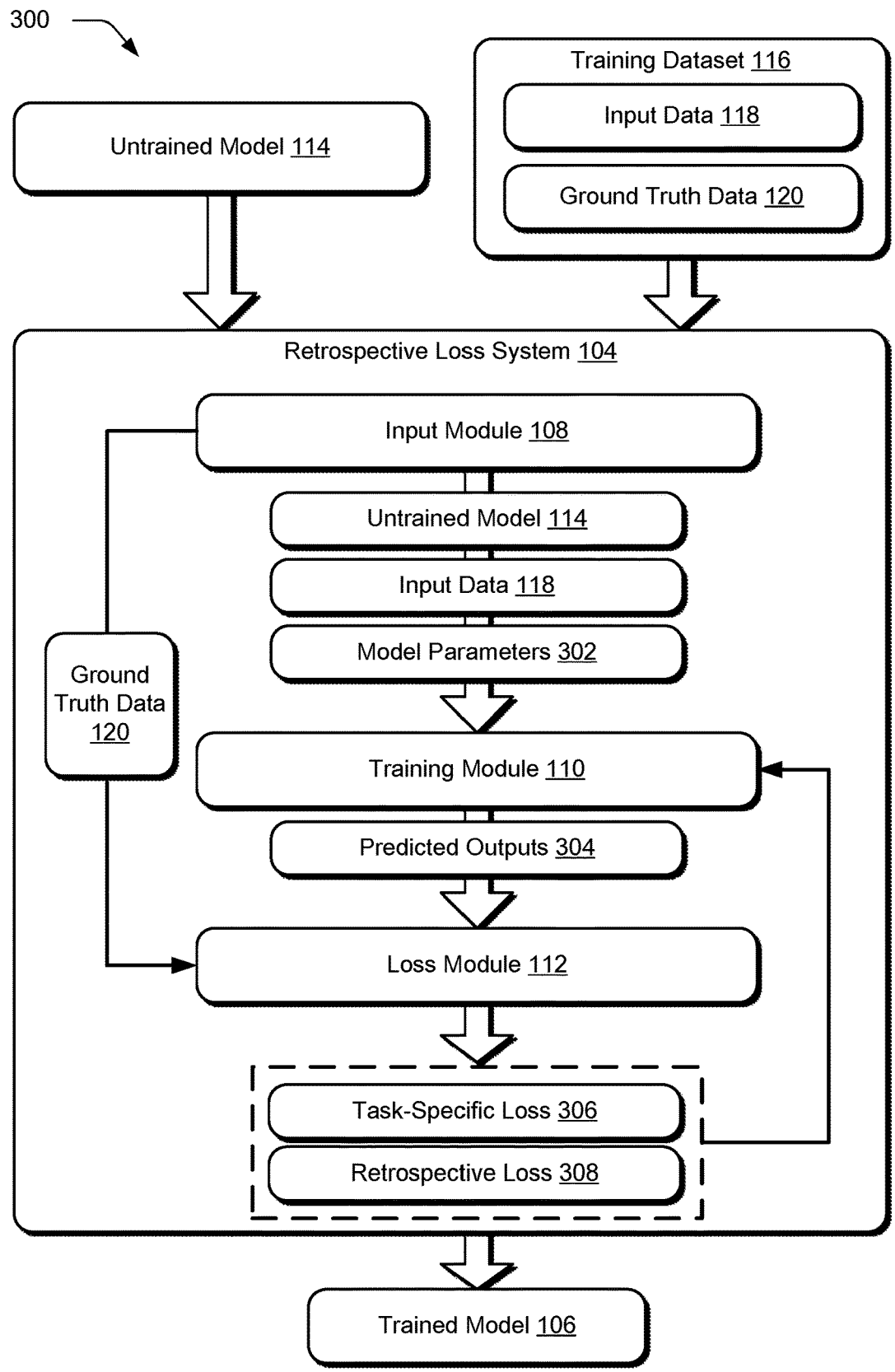
FIG. 3 illustrates an example implementation in which the retrospective loss system of FIG. 1 generates a trained model using the techniques described herein.

FIG. 3 illustrates an example system 300 useable to generate a trained model 106, which is representative of the untrained model 114 being trained to generate outputs from input data 118 that are within a threshold similarity to ground truth data 120 of the training dataset 116. In the illustrated example, system 300 includes modules of the retrospective loss system 104 as introduced with respect to FIG. 1, such as the input module 108, the training module 119, and the loss module 112. In one example, system 300 is implemented on a single computing device (e.g., computing device 102 of FIG. 1). In another example, system 300 is implemented on more than one computing device, as described in further detail below with respect to FIG. 7.

In the example system 300, the retrospective loss system 104 receives the untrained model 114 and a training dataset 116 for use in generating the trained model 106 according to a specified task or objective. As described herein, the type(s) and format(s) of data included in the input data 118 and ground truth data 120 of the training dataset 116 is dependent on the specified task or objective upon which the untrained model 114 is to be trained, and may comprise numerical data, textual data, audio data, image data, combinations thereof, and so forth.

Upon receiving the untrained model 114 and the training dataset 116, the input module 108 communicates the untrained model 114 and the input data 118 of the training dataset to the training module 110. In some implementations, the input module 108 is configured to process the input data 118 prior to communication to the training module 110 in order to format the input data 118 in a manner configured for input to the untrained model 114. Additionally, the input module 108 may communicate one or more model parameters 302 to the training module 110 for use in training the untrained model 114. For instance, the model parameters 302 may include information specifying a task or objective for which the untrained model 114 is to be configured in generating the trained model 106. Alternatively or additionally, the model parameters 302 may include initialized weights for one or more neurons of the untrained model, such as the neurons described and illustrated with respect to FIG. 2. In some implementations, the model parameters 302 may be specified via input by a user of the computing device implementing the retrospective loss system 104. Alternatively or additionally, the model parameters 302 may be randomly configured by the input module 108, specified by an architect of the retrospective loss system 104, received from a different computing device, combinations thereof, and so forth.

Upon receipt of the untrained model 114, the input data 118, and the one or more model parameters 302, the training module 110 is configured to generate predicted outputs 304 by providing the input data 118 to the untrained model 114 and causing the untrained model to generate the predicted outputs 304 according to a task or objective specified by the model parameters 302. For instance, in an example implementation where the untrained model 114 is being trained for image classification, the input data 118 may include raw pixel data for one or more images and the predicted outputs 304 may include one or more labels for objects depicted by the pixels of the one or more images. Alternatively, in another implementation where the untrained model 114 is being trained by the retrospective loss system for image generation, the input data 118 may include textual or audio descriptions of objects and the predicted outputs 304 may include one or more images of the objects. In a speech classification implementation, the input data 118 may include one or more utterances and the predicted outputs 304 may include data describing underlying words communicated by the one or more utterances along with identities of speakers of the one or more utterances.

The predicted outputs 304 are then communicated to the loss module 112 in order to determine a loss function to be implemented by the training module 110 for use in a subsequent step in training the untrained model 114. To determine the loss function, the loss module 112 compares the predicted outputs 304 to the ground truth data 120 included in the training dataset 116. The loss module 112 is configured to compare the predicted outputs 304 to the ground truth data 120 in a variety of different manners, such as based on absolute differences, using mean squared error, and the like.

Based on this comparison of the predicted outputs 304 to the ground truth data 120, the loss module 112 is configured to determine a task-specific loss 306 for use in further training the untrained model 114. As described above with respect to FIG. 2, the task-specific loss 306 determined by the loss module 112 is dependent on the specific task or objective for which the trained model 106 is configured. In addition to determining task-specific loss 306, the loss module 112 is further configured to determine retrospective loss 308 in order to generate a more efficient loss function to be implemented by the training module 110, compared to a loss function that considers only task-specific loss 306.

Mathematically, the retrospective loss 308 can be represented as $L_{retrospective}$, per Equation 3.

$$L_{retrospective}^T = K * \|g_\theta T(x_i) - y_i\| - \|g_\theta T(x_i) - g_\theta T_p(x_i)\| \quad \text{(Eq. 3)}$$

As set forth in Equation 3, $g(\cdot)$ represents the untrained model 114 as initially parameterized by its weights $\theta$, which may be specified by the model parameters 302. The optimal parameters of the trained model 106 generated from iteratively training the untrained model 114 may be denoted as $\theta^*$. Accordingly, the current parameters for the untrained model 114 during training by the training module 110 at a time step T may be represented as $\theta^T$. The retrospective loss 308 is representative of the retrospective loss system 104 leveraging past states of the untrained model 114 during training by the training module 110 to cue subsequent predicted outputs 304 to be closer to the ground truth data 120 than previous instances of the predicted outputs 304, represented by previous time step $T_p$. As such, each instance of the input data 118 is represented in Equation 3 as $x_i$, with its corresponding value in the ground truth data 120 represented by $y_i$. The time step T used to determine retrospective loss 308 may be designated using any suitable integer, and may alternatively be referred to as a retrospective update frequency value. Thus, T is representative of a delay between a current time step of training the untrained model 114 and a previous time step of training the untrained model 114. For instance, T may represent a single time step, 10 time steps, 50 time steps, and so forth. In this manner, the retrospective loss 308 may be determined at intervals defined by a retrospective update frequency, which may be pre-specified by the retrospective loss system 104 or manually configured by a user of the retrospective loss system 104.

$\kappa$ represents a scaling term for the retrospective loss 308 that is necessary in order to obtain sufficient gradient signal in later stages of training the untrained model 114, when $g_\theta T(x_i)$ approaches $y_i$. $\kappa$ may also be referred to as a retrospective loss margin, or a scalar multiplier, which corresponds to a strength of the retrospective loss 308's constraints that will be included in a loss algorithm for updating parameters of the untrained model 114. As training evolves towards an optimal state, a value of $\kappa$ may be increased, which consequently increases a strength of the retrospective loss 308's constraint included in the loss algorithm for updating parameters of the untrained model 114, as described in further detail below with respect to FIG. 4.

By minimizing loss relative to the untrained model 114's weights during a current training step, the retrospective loss 308 ensures that the predicted outputs 304 are closer to the ground truth data 120 at a current time step than the predicted outputs 304 were at a previous time step. Upon determining retrospective loss 308 for training the untrained model 114, the loss module 112 is configured to communicate the retrospective loss 308 together with the task-specific loss to the training module 110 for further refining weights of the untrained model 114 in generating the trained model 106. In order to ensure that the untrained model 114 is stable enough relative to its original configuration as specified by the model parameters 302, the loss module 112 may only communicate task-specific loss 306 to the training module during a warm-up period in generating the trained model 106.

The warm-up period for training the trained model 106 may comprise any suitable number of iterations, and is dependent on an amount by which the untrained model 114 must be modified from its initial parameters in order to produce trained model 106. After determining that the training module 110 has trained the untrained model 114 for a threshold number of warm-up iterations, the loss module 112 is configured to communicate both the task-specific loss 306 and the retrospective loss 308 to the training module 110 for use in subsequent training iterations. This use of only task-specific loss 306 for warm-up iterations, followed by use of both task-specific loss 306 and retrospective loss 308 may be implemented by the retrospective loss system 104 according to Algorithm 1.

Algorithm 1

```
begin
  Input: {x,y} in D
  Initialize θ^T, θ^TP, λ, U_f, Step_W, Step_R, B
  For Step ∈{1, 2, 3, ... Step_W} do
    Training Data of minibatch size B - (X(i), Y(i)).
    L(θ^T, X(i), Y(i) = L_task
    θ^T ← θ^T - η * ∇(L_task (θ^T, X(i), Y(i))
  end for
  for Step ∈{1, 2, 3, ... Step_R} do
    Training Data of minibatch size B - (X(i), Y(i)).
    L_retrospecive ← κ * dist (θ^T (X(i), Y(i))) -
      dist(θ^T (X(i)), θ^TP(X(i)))
    L(θ^T, θ^TP, X(i), Y(i)) = L_task + λ * L_retrospecitve
    If Step%U_f == 0 then
      θ^TP ← θ^T
    end if
    θ^T ← θ^T - η * ∇(L(θ^T, θ^TP, X(i), Y(i)))
  end for
end
```

By design, retrospective loss 308 is negative when the current parameter state of the untrained model 114 is farther away from the retrospective step, $T_p$, than the corresponding ground truth data 120. By minimizing retrospective loss 308, the retrospective loss system 104 accelerates the training process in identifying the optimal weights and parameters for inclusion in the trained model 106. In response to determining that the predicted outputs 304 generated by untrained model 114 are within a threshold difference to the ground truth data 120, as guided by the task-specific loss 306 and the retrospective loss 308, the retrospective loss system 104 outputs the untrained model 114 and its associated parameters as the trained model 106.

Having considered examples of determining retrospective loss for use in generating a trained model, consider now an example implementation of training an untrained model using the retrospective loss techniques described herein.

Figure 4:
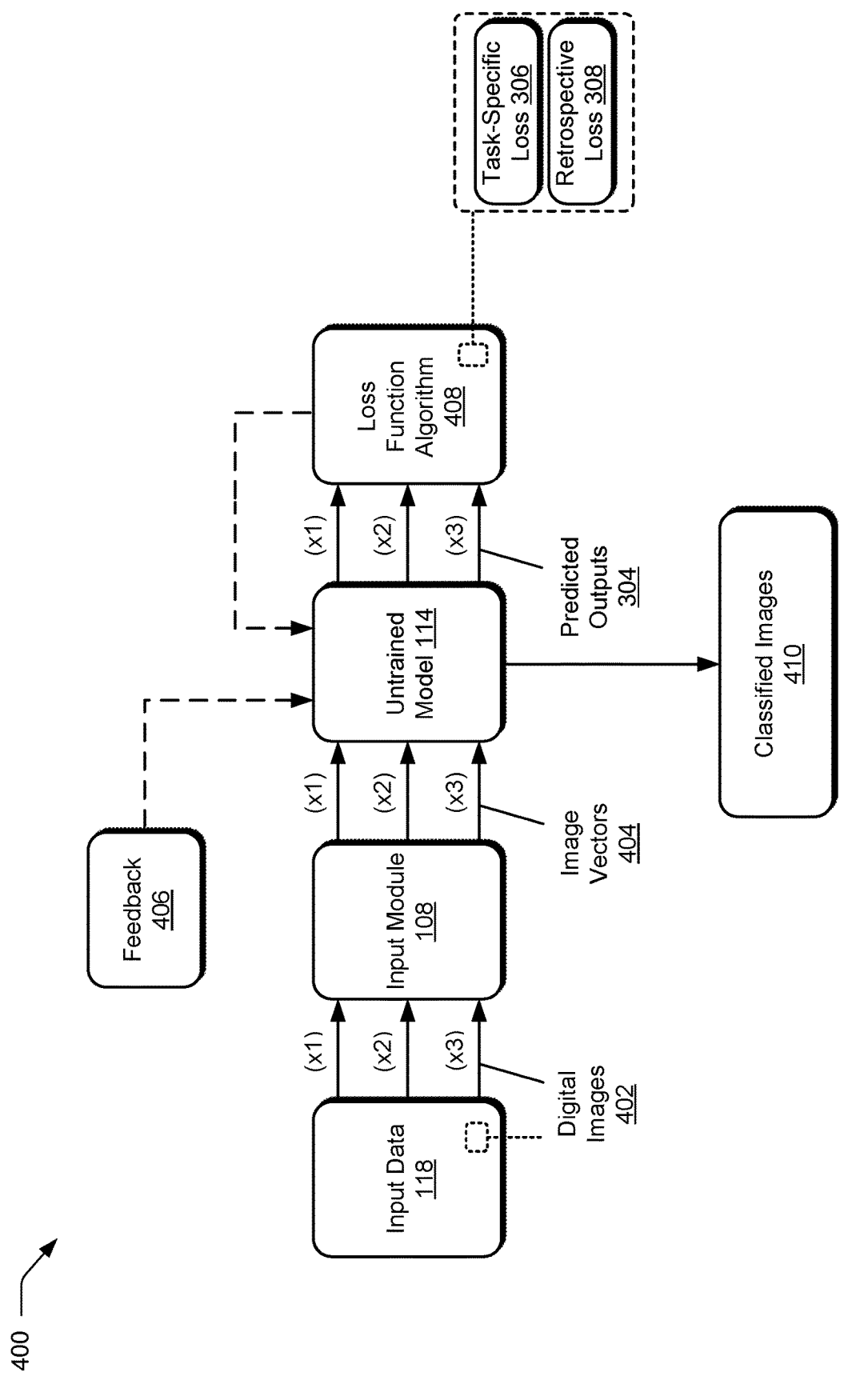
FIG. 4 illustrates an example implementation in which the retrospective loss system of FIG. 1 generates a trained model using the techniques described herein.

FIG. 4 illustrates an example implementation 400 of the retrospective loss system 104 generating a trained model using the retrospective loss techniques described herein. The illustrated example depicts a scenario in which the retrospective loss system 104 generates a trained model 106 using an image classification objective, such that the trained model 106 is configured to classify images (e.g., by labeling individual images to indicate one or more objects depicted in the image). In the example implementation 400, the input data 118 obtained by the input module 108 comprises digital images 402, such as three example digital images identified as x1, x2, and x3. The input module 108 may further process the input data 118 into a format that is suitable for use in training the untrained model 114. For instance, in an example implementation where the untrained model 114 is configured to process information encapsulated in each digital image 402 in the form of a vector representation (e.g., an image's array of pixel values encapsulated in a vector), the input module 108 is configured to generate image vectors 404 for each one of the digital images x1, x2, and x3.

Generation of the image vectors 404 is merely representative of functionality of the input module 108 to transform the input data 118 into a format of data that the untrained model 114 is configured to process, and is representative of any suitable type of data format. Alternatively, in implementations where the untrained model 114 is configured to directly process the input data 118 (e.g., the digital images 402), the input module 108 is configured to pass the input data 118 to the untrained model 114 without altering a format of the input data 118. Additionally, although not illustrated, the input module 108 is configured to initialize the untrained model 114 using one or more model parameters 302, which may specify an objective or task for which the untrained model 114 is to be trained and one or more initial weights for the untrained model 114.

Given the input data 118, the untrained model 114 is configured to generate predicted outputs 304 for each of the image vectors 404, which are correspondingly represented as x1, x2, and x3, according to the specified objective or task for which the untrained model 114 is being trained. Using the techniques described herein, the training module 110 of the retrospective loss system 104 is configured to train the untrained model 110 using supervised and/or unsupervised learning techniques. In a supervised learning scenario, the feedback 406 is representative of a known condition, such as a yes/no type input affirming whether the predicted output 304 for a digital image 402 accurately classifies the image. Provision of feedback 406 may be received from a user of the computing device implementing the retrospective loss system 104, and may be gleaned from ground truth data 120 received in a training dataset 116 along with the input data 118. In an unsupervised learning scenario, feedback 406 to the untrained model 114 is optionally provided, as indicated by the dotted line connecting feedback 406 with the untrained model 114.

The predicted outputs 304 are then compared against the ground truth data 120 for the input data 118 by the loss module 112 of the retrospective loss system 104. Based on this comparison, the loss module 112 determines a loss function algorithm 408 for use by the training module 110 in fine-tuning weights of the untrained model 114. The loss function algorithm 408 may be determined by the loss module 112 based on both the task-specific loss 306 for the task or objective used in training the untrained model 114 as well as retrospective loss 308 ascertained from prior training states of the untrained model 114. As described herein, inclusion of retrospective loss 308 in the loss function algorithm 408 is dependent on a current training time step of the untrained model 114. For instance, in response to determining that the current training time step is within a warm-up period for the untrained model 114, the loss module 112 is configured to generate the loss function algorithm 408 using only the task-specific loss 306. In response to determining that the current training time step is no longer within the warm-up period for the untrained model the loss module 112 is configured to generate the loss function algorithm 408 using both task-specific loss 306 as well as retrospective loss 308. The loss function algorithm 408 is updated at each training time step for the untrained model 114, until weights of the untrained model 114 have been tuned such that the predicted outputs 304 are within a threshold difference from the ground truth data 120 for the input data 118, as represented by the classified images 410.

Having considered example details of generating a trained model using retrospective loss, consider now example procedures to illustrate aspects of the techniques described herein.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-4.

Figure 5:
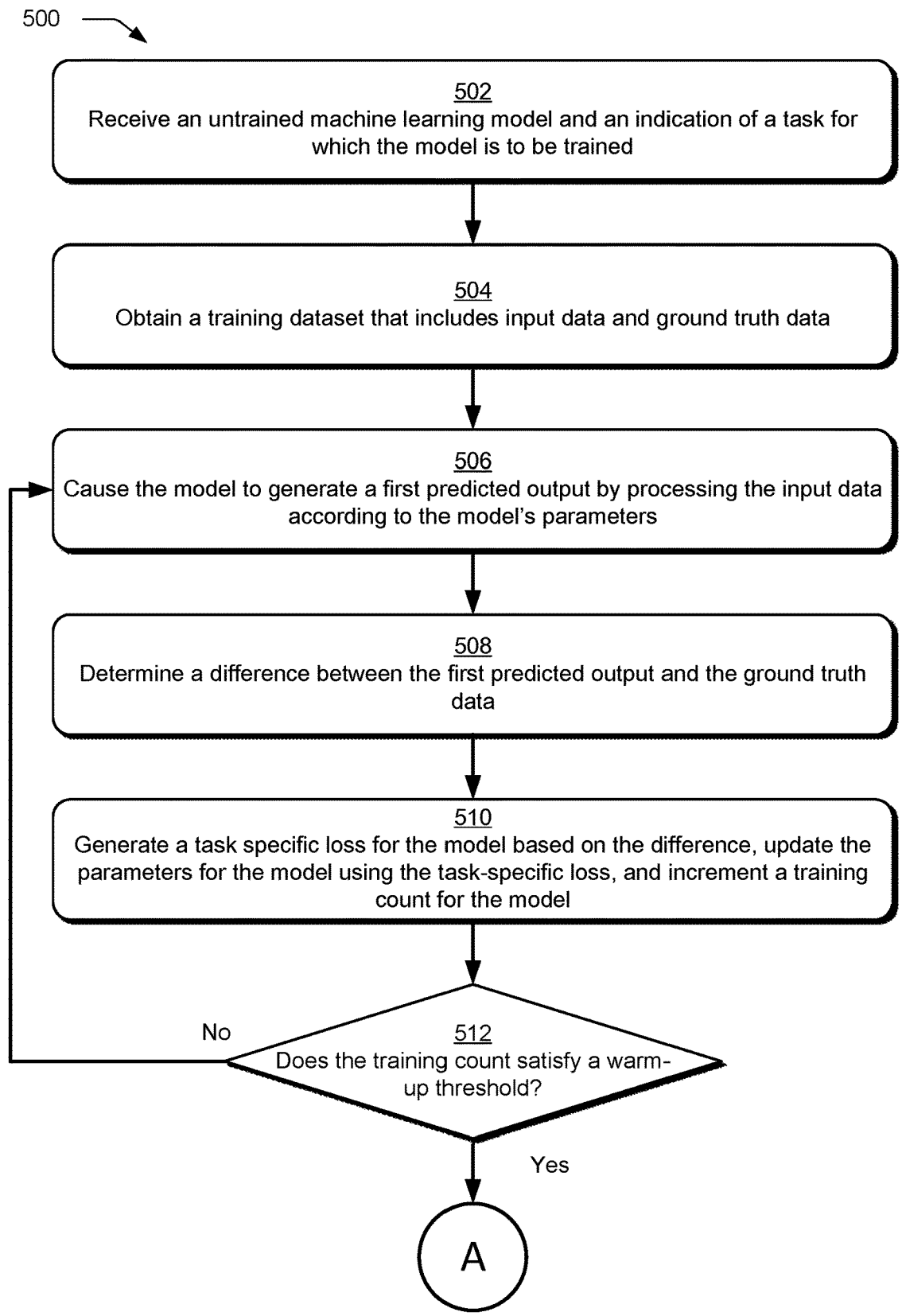
FIG. 5 is a flow diagram depicting a procedure in an example implementation for generating a trained model using the techniques described herein.

FIG. 5 depicts a procedure 500 in an example implementation of generating a machine learning model that is trained for a specified task in accordance with aspects of the techniques described herein. An untrained machine learning model and an indication of a task for which the model is to be trained are received (block 502). The input module 108 of the retrospective loss system 104, for instance, receives the untrained model 114. The untrained model 114 may be obtained from input to a computing device implementing the retrospective loss system 104, such as computing device 102, may be received from remote storage location 122, may be received from a different computing device via network 124, or combinations thereof. Similarly, the indication of the task for which the untrained model 114 is to be trained may be received from input to the computing device 102, from remote storage location 122, from a different computing device via network 124, or combinations thereof. The untrained model 114 is representative of any type of machine learning model including but not limited to models with architectures based on neural networks (e.g., fully-connected neural networks, convolutional neural networks, or recurrent neural networks), deep learning networks, generative adversarial networks (GANs), decision trees, support vector machines, linear regression, logistic regression, Bayesian networks, random forest learning, dimensionality reduction algorithms, boosting algorithms, combinations thereof, and so forth.

A training dataset that includes input data and ground truth data are then obtained (block 504). The input module 108, for instance, obtains training dataset 116 from remote storage location 122, which includes input data 118 and ground truth data 120. Alternatively or additionally, the input module 108 may obtain the training dataset 116 from the computing device implementing the retrospective loss system 104, from a different computing device via network 124, or combinations thereof. The ground truth data 120 is representative of the optimal outputs to be produced by the untrained model 114, after completion of training, in response to processing the input data 118 as inputs. In accordance with one or more implementations, the training dataset 116 obtained by the input module 108 is dependent on the task or objective for which the untrained model 114 is to be trained.

For instance, in an example implementation where the trained model 106 is configured for image classification, the input data 118 may include a plurality of unlabeled images and the ground truth data 120 may include a plurality of images that are classified based on their depicted content (e.g., via labels identifying one or more objects depicted in each image, via a tag indicating an environment depicted in the image, combinations thereof, and so forth). Alternatively, in an example implementation where the trained model 106 is configured for speech recognition, the input data 118 may include a plurality of utterances and the ground truth data 120 may include a plurality of utterances that are each associated with information describing the utterance (e.g., one or more vocabulary words included in the utterance, an identification of a speaker of the utterance, etc.). Further, in an example implementation where the trained model 106 is configured for image generation, the input data 118 may include various textual descriptions of content to be represented in an image, while the ground truth data 120 may include a plurality of images that are each associated with a textual description of content describing content depicted in the image.

The untrained machine learning model is then caused to generate a first predicted output by processing the input data according to the model's parameters (block 506). The training module 110 of the retrospective loss system 104, for instance, causes the untrained model 114 to generate one or more predicted outputs 304 by processing the input data 118 according to the model parameters 302. The model parameters 302 may include information specifying a task or objective for which the untrained model 114 is to be configured in generating the trained model 106. Alternatively or additionally, the model parameters 302 may include initialized weights for one or more neurons of the untrained model, such as the neurons described and illustrated with respect to FIG. 2. In some implementations, the model parameters 302 may be specified via input by a user of the computing device implementing the retrospective loss system 104. Alternatively or additionally, the model parameters 302 may be randomly configured by the input module 108, specified by an architect of the retrospective loss system 104, received from a different computing device, combinations thereof, and so forth.

A difference between the first predicted output and the ground truth data is then determined (block 508). The loss module 112 of the retrospective loss system 104, for instance, compares the predicted outputs 304 to the ground truth data 120 included in the training dataset 116 used to train the untrained model 114. The loss module 112 is configured to compare the predicted outputs 304 to the ground truth data 120 in a variety of different manners, such as based on absolute differences, using mean squared error, and so forth.

In response to determining the difference between the first predicted output and the ground truth data, a task specific loss for the model is generated based on difference (block 510). In addition to determining task-specific loss for the untrained model 114, parameters for the model are updated using the task-specific loss and a training count for the model is incremented (block 510). The loss module 112, for instance, generates a task-specific loss 306, which is dependent on a specified task for which the untrained model 114 is being trained (e.g., image classification, speech recognition, image generation, text processing, graph classification, and so forth). In response to receiving an indication of the task-specific loss 306, the training module 110 of the retrospective loss system 104 is configured to fine-tune the model parameters 302 for the untrained model 114. The training module 110 is further configured to increment a training count associated with the untrained model 114, which is indicative of a number of training time steps over which the retrospective loss system 104 has updated the model parameters 302 in training the untrained model 114.

A determination is then made as to whether the training count for the model satisfies a warm-up threshold (block 512). The training module 110, for instance, may compare the current training count for the untrained model 114 to a warm-up count that specifies a warm-up period for training the untrained model 114 using only task-specific loss 306. The warm-up period may be defined as any suitable number of training iterations (e.g., performance of the operations described in blocks 506, 508, and 510), and may optionally be defined by a user of the computing device implementing the retrospective loss system 104. In response to a determination that the training count does not satisfy the warm-up threshold, operation returns to block 506, where the model is caused to generate another predicted output by processing the input data 118 according to the model parameters 302 that were updated in block 510. This cycle of performing operations described in blocks 506, 508, and 510 is repeated until the untrained model 114's training count satisfies (e.g., is equal to and/or greater than) the warm-up threshold. In response to determining that the training count satisfies the warm-up threshold, operation proceeds to FIG. 6.

Figure 6:
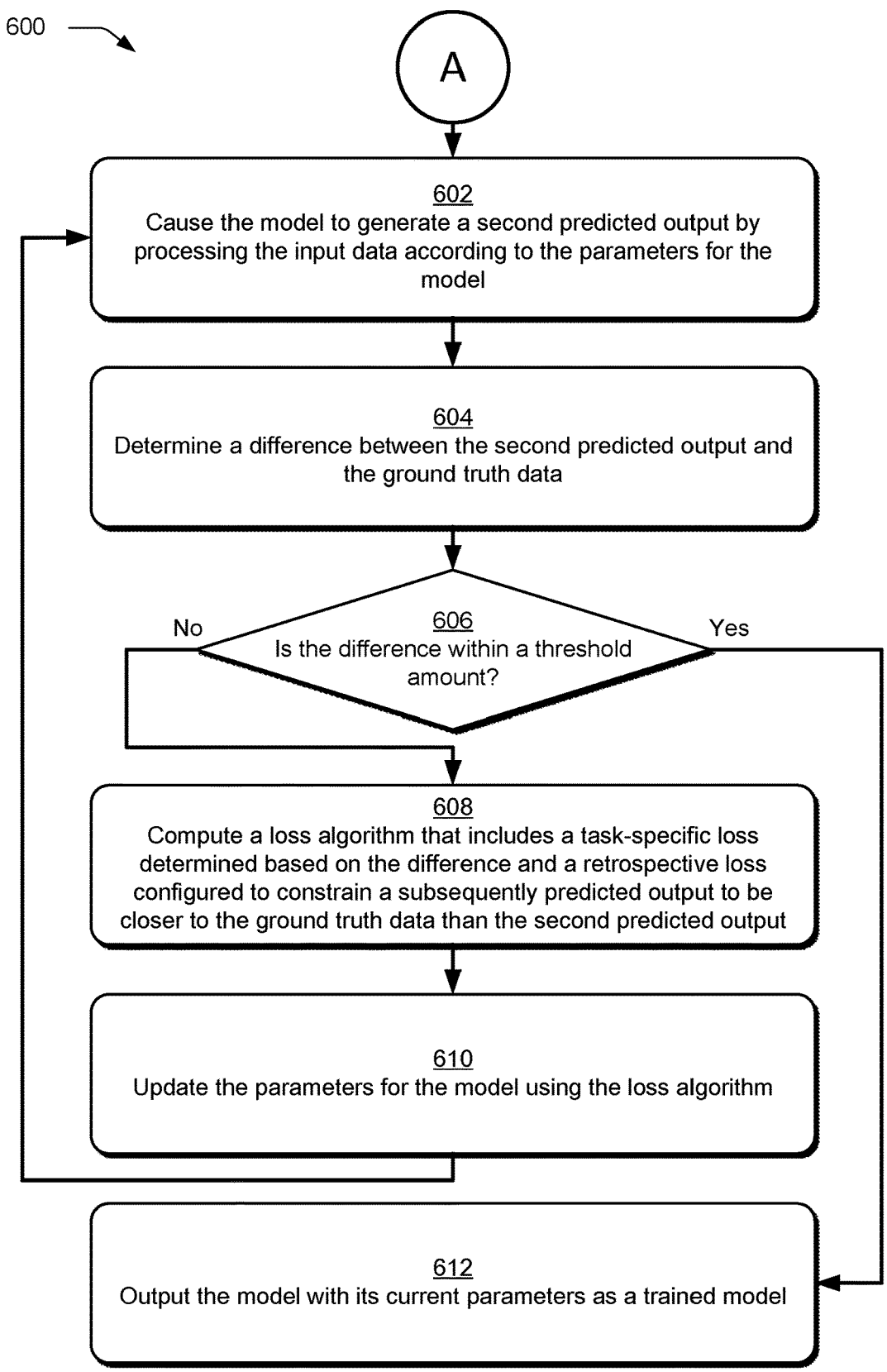
FIG. 6 is a flow diagram depicting a procedure in an example implementation for generating a trained model using the techniques described herein.

FIG. 6 depicts a procedure 600 in an example implementation of generating a machine learning model that is trained for a specified task using retrospective loss in accordance with aspects of the techniques described herein. The untrained machine learning model is caused to generate a second predicted output by processing input data according to parameters for the model (block 602). The training module 110 of the retrospective loss system 104, for instance, causes the untrained model 114 to generate one or more predicted outputs 304 by processing the input data 118 according to the model parameters 302. The model parameters 302 may include information specifying a task or objective for which the untrained model 114 is to be configured in generating the trained model 106. Alternatively or additionally, the model parameters 302 may include weights for one or more neurons of the untrained model, such as the neurons described and illustrated with respect to FIG. 2. In some implementations, the model parameters 302 are representative of initial weights for the untrained model 114 that have been fine-tuned by the retrospective loss system 104 during one or more warm-up training iterations.

A difference is then determined between the second predicted output and ground truth data (block 604). The loss module 112 of the retrospective loss system 104, for instance, compares the predicted outputs 304 to the ground truth data 120 that correlates with the input data 118, as included in the training dataset 116 used to train the untrained model 114. The loss module 112 is configured to compare the predicted outputs 304 to the ground truth data 120 in a variety of different manners, such as based on absolute differences, using mean squared error, and so forth.

A determination is then made as to whether the difference between the second predicted output and the ground truth data is within a threshold amount (block 606). The loss module 112, for instance, quantifies a difference between the second predicted output generated by the untrained model 114, represented as predicted outputs 304 in FIG. 3, and the ground truth data 120. In some implementations, the threshold amount of difference between the predicted outputs 304 and the ground truth data 120 is zero (i.e., that the threshold amount of difference requires the predicted outputs 304 to be identical to the ground truth data 120). Alternatively, the threshold amount of difference may specify a percentage difference between the predicted outputs 304 and the ground truth data 120 (e.g., 5% difference). The threshold amount of difference may be pre-specified by the retrospective loss system 104. Alternatively or additionally, the threshold amount of difference may be specified or adjusted via input received from a user of a computing device implementing the retrospective loss system 104.

In response to determining that the difference between the second predicted output and the ground truth data is not within the threshold amount, a loss algorithm that includes both a task-specific loss and a retrospective loss is computed (block 608). The task-specific loss represented in the computed loss algorithm is determined based on the difference between the second predicted output and the ground truth data. The loss module 112, for instance, generates a task-specific loss 306, which is dependent on a specified task for which the untrained model 114 is being trained (e.g., image classification, speech recognition, image generation, text processing, graph classification, and so forth). In addition to the task-specific loss 306, the retrospective loss included in the computed loss algorithm represents a constraint that forces a subsequently predicted output (e.g., an instance of the predicted outputs 304 produced during a subsequent training iteration) generated by the untrained model 114 to be closer to the ground truth data 120 than the second predicted output. The loss module 112 of the retrospective loss system 104, for instance, determines the retrospective loss 308 to be included in the loss algorithm by leveraging past states of the untrained model 114 during training to cue subsequent predicted outputs 304 to be closer to the ground truth data 120 than previous instances of the predicted outputs 304.

In response to computing the loss algorithm, the parameters for the model are updated using the loss algorithm (block 610). In response to receiving an indication of the task-specific loss 306 and the retrospective loss 308 included in the loss algorithm, the training module 110 of the retrospective loss system 104 is configured to fine-tune the model parameters 302 for the untrained model 114. By virtue of including retrospective loss 308 in the loss algorithm, fine-tuning the model parameters 302 results in a subsequently predicted output generated by the untrained model 114 to be closer to the ground truth data 120 than a previously predicted output. The training module 110 is further configured to increment a training count associated with the untrained model 114, which is indicative of a number of training time steps over which the retrospective loss system 104 has updated the model parameters 302 in training the untrained model 114. Operation then returns to block 602, where the untrained model 114 is caused to generate another predicted output by processing the input data 118 according to the model parameters 302 as updated according to block 610. This cycle of performing operations described in blocks 602, 604, 606, 608, and 610 repeats until a determination is made that a difference between predicted outputs generated by the model is within a threshold amount of difference to the ground truth data used to train the model (block 606).

In response to determining that the difference between a predicted output of the model and the ground truth data is within a threshold amount, the model with its current parameters is output as a trained model (block 612). The retrospective loss system 104, for instance, outputs the trained model 106, which is representative of an instance of the untrained model 114 configured using model parameters 302 that resulted in the generation of predicted outputs 304 being within the threshold amount of difference to the ground truth data 120. The trained model 106 may then be subsequently be used to complete the specified task or objective for which it was trained. The trained model 106 may be output to local storage of the computing device implementing the retrospective loss system 104, such as computing device 102. Alternatively or additionally, the trained model 106 may be output to one or more storage locations that are remote from the computing device 102, such as to remote storage location 122 or to a different computing device via network 124.

Having described example procedures in accordance with one or more implementations, consider now an example system and device that can be utilized to implement the various techniques described herein.

Example System and Device

Figure 7:
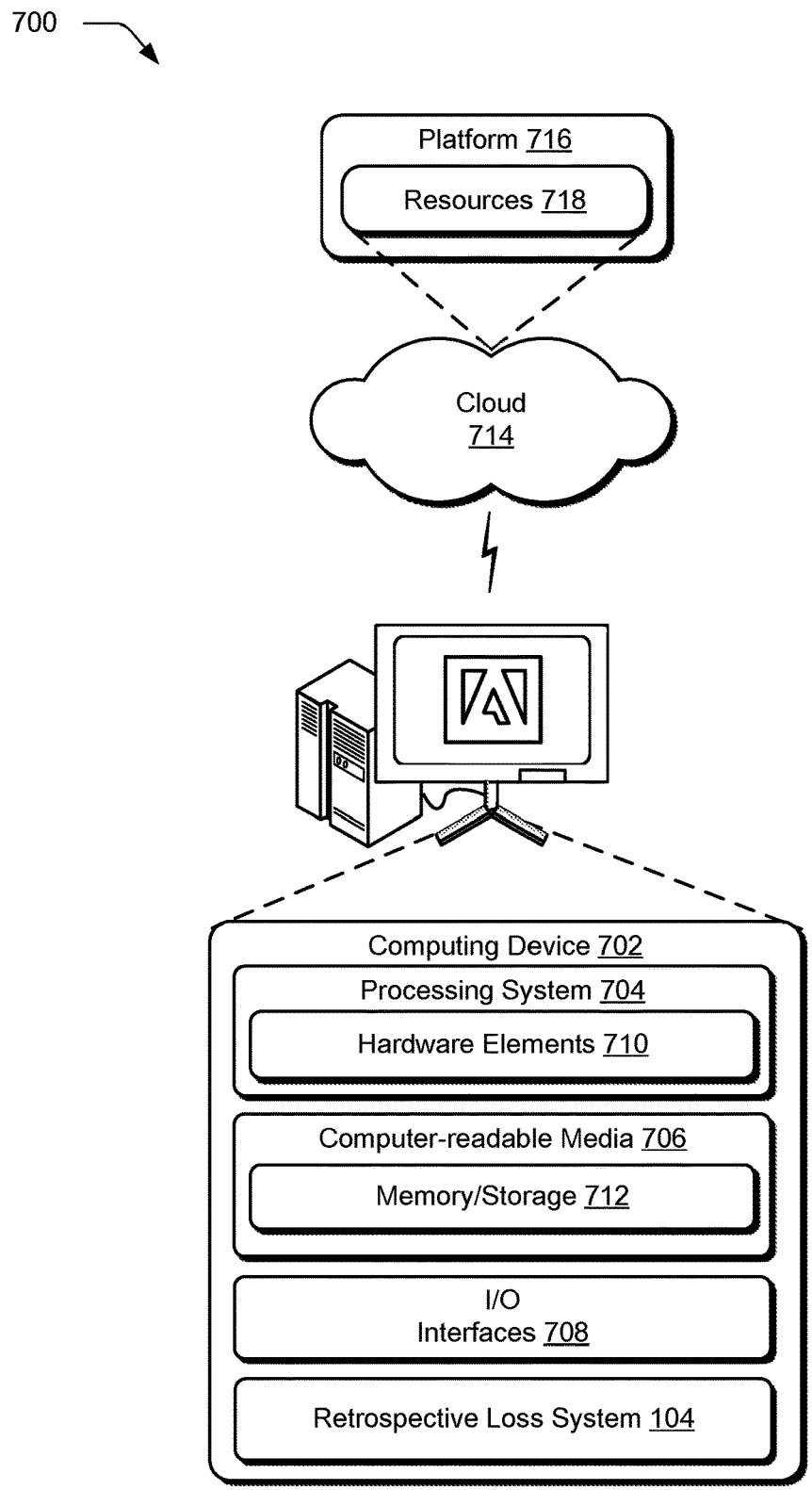
FIG. 7 illustrates an example system including various components of an example device that can be implemented as a computing device as described and/or utilized with reference to FIGS. 1-6 to implement the techniques described herein.

FIG. 7 illustrates an example system generally at 700 that includes an example computing device 702 that is representative of one or more computing systems and/or devices that may implement the various techniques described herein. This is illustrated through inclusion of the retrospective loss system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

In the illustrated example, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for generating a trained model, a method implemented by at least one computing device, the method comprising:
   receiving, by the at least one computing device, an untrained model and an indication of a task for which the untrained model is to be trained;
   generating, by the at least one computing device, the trained model by training the untrained model for a plurality of iterations, each iteration of the plurality of iterations comprising:
      causing the untrained model to generate, from input data, a current predicted output;
      determining a difference between the current predicted output and a ground truth dataset for the input data;
      computing a loss function that includes:
         a task-specific loss based on the difference and the task for which the untrained model is to be trained; and
         a retrospective loss determined using a past predicted output generated from a past parameter state of the untrained model, the retrospective loss constraining a difference between the current predicted output and the ground truth dataset to be smaller than a difference between the past predicted output and the ground truth dataset;
      updating a weight value of at least one of a plurality of neurons of the untrained model by backpropagating an error computed using the loss function through layers of the untrained model; and
   outputting the updated weight value of the at least one of the plurality of neurons as part of the trained model.

2. The method of claim 1, wherein outputting the updated weight value of the at least one of the plurality of neurons as part of the trained model is performed responsive to a determination that the difference between the current predicted output and the ground truth dataset is within a difference threshold.

3. The method of claim 2, wherein the difference threshold specifies the current predicted output as being identical to the ground truth dataset.

4. The method of claim 1, further comprising obtaining a training dataset including the input data and the ground truth dataset based on the task for which the untrained model is to be trained, the ground truth dataset for the input data representing outputs to be generated by the untrained model when processing the input data according to the task.

5. The method of claim 1, further comprising initializing the untrained model based on the task for which the untrained model is to be trained, wherein the untrained model is configured as a deep neural network comprising the plurality of neurons, wherein initializing the untrained model comprises assigning a weight value to one or more of the plurality of neurons.

6. The method of claim 1, further comprising pre-training the untrained model for at least one warm-up iteration prior to training the untrained model for the plurality of iterations, each warm-up iteration comprising:
   causing the untrained model to generate an initial output from the input data according to the task;
   determining a first difference between the initial output and the ground truth dataset;
   determining a task-specific loss function for the untrained model based on the first difference; and
   updating one or more parameters of the untrained model based on the task-specific loss function.

7. The method of claim 1, further comprising determining the retrospective loss according to a retrospective update frequency that specifies a delay between different ones of the plurality of iterations when the retrospective loss is to be updated in computing the loss function.

8. The method of claim 1, further comprising determining the retrospective loss using a retrospective loss margin, wherein each iteration of the plurality of iterations further comprises increasing a value of the retrospective loss margin.

9. The method of claim 1, wherein the untrained model is an image classification model and the task for which the untrained model is to be trained is image object classification, the input data comprising one or more images and the ground truth dataset comprising labels identifying, for each of the one or more images, at least one object depicted in the image.

10. The method of claim 1, wherein the untrained model is a speech recognition model and the task for which the untrained model is to be trained is utterance identification, the input data comprising one or more utterances and the ground truth dataset comprising labels identifying, for each of the one or more utterances, at least one word communicated by the utterance.

11. The method of claim 1, wherein the untrained model is a text processing model and the task for which the untrained model is to be trained is emotion recognition, the input data comprising one or more sentences of text and the ground truth dataset comprising labels identifying, for each of the one or more sentences, at least one emotion indicated by the sentence.

12. The method of claim 1, wherein the untrained model is an image generation model and the task for which the untrained model is to be trained is rendering an image from text, the input data comprising one or more textual descriptions of an environment and the ground truth dataset comprising labels identifying, for each of the one or more textual descriptions of the environment, a rendered image of the environment.

13. The method of claim 1, wherein the untrained model is a graph classification model and the task for which the untrained model is to be trained is representing data from a plurality of different domains in a common framework, the input data comprising data points from the plurality of different domains and the ground truth dataset comprising a visual representation of differences and similarities among the data points.

14. A method for generating an output using a model trained with retrospective loss, a method implemented by at least one computing device, the method comprising:
receiving, by the at least one computing device, input data and an indication of an objective to be reached from the input data;
identifying, by the at least one computing device, the model, the model being trained to reach the objective for a plurality of iterations by:
generating, from training data, a predicted output;
determining a difference between the predicted output and a ground truth dataset for the training data;
generating a loss function that includes:
a task-specific loss based on the difference and the objective; and
a retrospective loss that constrains the model to generate a second predicted output from the training data, the second predicted output being closer to the ground truth dataset than the predicted output; and
updating a weight value of at least one of a plurality of neurons of the model by backpropagating an error computed based on the loss function through layers of the model;
obtaining, by the at least one computing device, the model; and
causing, by the at least one computing device, the model to generate an output by inputting the input data to the model.

15. The method of claim 14, wherein the input data comprises an image and the objective comprises labeling at least one object depicted in the image, wherein the model is an image classification model trained to label image objects using the retrospective loss.

16. The method of claim 14, wherein the ground truth dataset for the training data represents outputs to be generated by the model when processing the training data according to the objective.

17. The method of claim 14, wherein the model is trained to reach the objective using a retrospective loss margin that scales during training of the model, each iteration of the plurality of iterations further comprising increasing a value of the retrospective loss margin.

18. The method of claim 14, wherein the model is trained to reach the objective according to a retrospective update frequency that specifies a delay between different ones of the plurality of iterations when the retrospective loss is to be updated in generating the loss function.

19. In a digital medium environment for generating a trained model, a system comprising:
one or more processors; and
a computer-readable storage medium having instructions stored thereon that are executable by the one or more processors to perform operations comprising:
receiving an untrained model and an indication of a task for which the untrained model is to be trained;
training the untrained model for a plurality of warm-up iterations until a warm-up threshold of iterations has been reached, each of the plurality of warm-up iterations comprising:
causing the untrained model to generate, from input data, a first predicted output;
determining a first difference between the first predicted output and a ground truth dataset for the input data; and
generating a task-specific loss based on the first difference and updating one or more parameters of the untrained model based on the task-specific loss;
responsive to a determination that the warm-up threshold of iterations has been reached, refining the untrained model for at least one refinement iteration, each refinement iteration comprising:
causing the untrained model to generate, from the input data, a second predicted output;
determining a second difference between the second predicted output and the ground truth dataset;
computing a loss function using a second task-specific loss determined based on the second difference and a retrospective loss, the retrospective loss being a constraint that forces a subsequently predicted output of the untrained model to be closer to the ground truth dataset than the second predicted output; and
updating a weight value of at least one of a plurality of neurons of the untrained model by backpropagating an error computed based on the loss function through layers of the untrained model; and
outputting the updated weight value of the at least one of the plurality of neurons as part of the trained model.

20. The system of claim 19, the operations further comprising initializing the untrained model based on the task for which the untrained model is to be trained, wherein the untrained model is configured as a deep neural network comprising the plurality of neurons, wherein initializing the untrained model comprises assigning a weight value to one or more of the plurality of neurons.

* * * * *